United States Patent [19]

Noggle et al.

[11] Patent Number: 5,479,974
[45] Date of Patent: Jan. 2, 1996

[54] NOISE-REDUCTION SYSTEM FOR VEHICLE TIRES

[75] Inventors: Gary C. Noggle, Doylestown; Donald E. Andrews, Jr., Mogadore, both of Ohio

[73] Assignee: Bridgestone/Firestone, Inc., Akron, Ohio

[21] Appl. No.: 419,684

[22] Filed: Apr. 10, 1995

Related U.S. Application Data

[63] Continuation-in-part of Ser. No. 323,284, Oct. 14, 1994, abandoned.

[51] Int. Cl.$^6$ ........................................... B60C 5/00
[52] U.S. Cl. ............................. 152/333.1; 152/450
[58] Field of Search ...................... 152/333,1, 334.1, 152/153, 458, 514, 515, 450

[56] References Cited

U.S. PATENT DOCUMENTS

| | | | |
|---|---|---|---|
| 1,956,739 | 5/1934 | Gollert | 152/13 |
| 2,493,731 | 1/1950 | Watter | 152/333 |
| 2,780,806 | 2/1957 | Van Alstyne | 343/18 |
| 2,824,592 | 2/1958 | Neisler, Jr. | 152/9 |
| 3,047,285 | 7/1962 | Gross | 267/65 |
| 4,381,026 | 4/1983 | Skidmore | 152/153 |
| 4,392,522 | 7/1983 | Bachorr | 152/341 |
| 4,620,580 | 11/1986 | Groezinger et al. | 152/153 |
| 4,909,295 | 3/1990 | Nirei et al. | 152/333.1 |

*Primary Examiner*—Geoffrey L. Knable
*Attorney, Agent, or Firm*—Carmen S. Santa Maria

[57] ABSTRACT

A noise-reduction system for a vehicle wheel assembly which is comprised of a usual rim and a tubeless pneumatic tire having a pair of sidewalls and bead areas mounted thereon. A plurality of flexible, non-self-supporting pieces of cloth or other sheet material are attached to the rim or are attached to the bead areas and extend therebetween, preferably at equally spaced intervals, and form baffles within the annular air chamber of the wheel assembly to reduce noise by changing the characteristics of the sound waves created within the wheel assembly. When the wheel assembly is stationary, the baffles collapse on the rim, and when the wheel assembly is rotating, the baffles move outwardly by centrifugal force and substantially conform to the transverse cross section of the air chamber to obstruct the movement of acoustic waves traveling with the chamber to reduce tire noise.

11 Claims, 2 Drawing Sheets

NOISE-REDUCTION SYSTEM FOR VEHICLE TIRES

CROSS REFERENCE TO RELATED APPLICATION

This application is a continuation-in-part of application Ser. No. 08/323,284, filed Oct. 14, 1994 now abandoned.

BACKGROUND OF THE INVENTION

1. Technical Field

The invention relates to pneumatic vehicle tires and in particular to a baffle system mounted within the tire to reduce road noise. More particularly, the invention relates to a dynamic baffle system mounted within the tire which becomes effective when the tire is rotating to significantly reduce noise created by the acoustic cavity resonance within the air chamber of the tire by changing the characteristics of the sound waves created within a rotating tire.

2. Background Information

The reduction of noise created by a vehicle tire is a continuing effort for tire designers, whether the noise is generated by the particular tread configuration of the tire or other characteristics thereof. In addition to the various noises caused by the external configuration of the tire and tread, an interior noise is created by the acoustic cavity resonance within the air chamber of a tubeless pneumatic tire. The elimination or reduction of this internal cavity resonance noise is desirable to provide a quieter pneumatic tire, especially for use on passenger vehicles.

The reduction or elimination of this internal noise has been attempted over the years, and various structures, devices and systems have been suggested for achieving this result. One such system is shown is U.S. Pat. No. 4,392,522. This system uses a sound-absorbing insulating material, such as blocks of foam, which are attached to the rim or to the tire interior, or uses foam discs which are bonded to the inner surface of the tire sidewalls. This system is intended to reduce noise by deadening the noise and not by changing the characteristics of the sound waves.

Another prior art system which attempts to reduce or eliminate the noise created by this internal resonance is shown in U.S. Pat. No. 4,909,295. One embodiment of this system uses a separate air valve for inflating a plurality of hollow baffles which are attached to an annular manifold member mounted circumferentially about the rim, wherein the baffles are inflated and extend radially within the annular air chamber of the tire. This system requires additional machining in the rim for an air valve and the additional cost associated therewith. Another embodiment of this prior art system uses rigid plates which are attached to an annular member surrounding the rim, which plates are spring biased to a radially outwardly extending position to form a plurality of internal chamber sections to reduce the noise caused by the acoustic cavity resonance. Although the various embodiments of U.S. Pat. No. 4,909,295 may achieve the desired results, they would be relatively expensive to produce and install, increasing the overall cost of the wheel assembly, and in addition, would increase the difficulty of changing the tire on the rim due to the interference caused by the inflatable baffle members or spring-biased rigid plate members. Furthermore, when a rigid internal plate member is used within the tire, it could cause damage to the tire or baffle if the tire is seriously deflected, such as when hitting a depression or protrusion in the roadway.

U.S. Pat. No. 2,493,731 shows an inner tube for use in a pneumatic tire wherein the tube is subdivided into a plurality of chambers by radial partition walls which are formed integrally with the inner surface of the tube. The chamber walls are formed with slits to permit the flow of air between the internal chambers to cushion shock applied to the tire, and are not concerned with the reduction of noise created by the internal cavity resonance.

U.S. Pat. No. 4,381,026 discloses a wheel assembly which is provided with a plurality of circumferentially spaced paddles mounted on the rim of the wheel, which extend a relatively short distance radially into the air chamber. These paddles direct the air within the air chamber of the tire from the rim toward the tread to transfer heat generated at the tread to the heat sink of the drop center of the rim, and not for noise reduction or suppression.

U.S. Pat. No. 2,780,806 discloses an aircraft tire having internal members which are specially designed reflector units to increase the radar detection of the aircraft during landing when the tire is in a lowered position.

U.S. Pat. No. 1,956,739 discloses a device which is mounted inside the inner tube of a pneumatic tire for cooling the tire by use of a wire bundle which is attached at one end within the tire. The wire bundle distributes fluid contained within the inner tube throughout the interior of the tube to provide cooling for the tire. This wire bundle does not provide any noise reduction by changing the characteristics of the sound waves within the tire.

U.S. Pat. No. 3,047,285 discloses the mounting of a heat sink member within the air chamber of a pneumatic tire, which consists of a plurality of glass fibers attached to the tire rim. These fibers would add a considerably unbalanced weight in the tire and are intended to reduce heat transfer and the build-up of heat within the tire, and are not intended in any manner to reduce tire noise by changing the characteristics of the sound waves within the tire.

U.S. Pat. No. 4,620,580 discloses a belt which wraps around the rim of a tire and extends into a liquid contained within the tire for removing heat to cool the tire. This construction requires liquid inside of the tire, and would not be suitable for pneumatic tires used at high speeds, such as a usual passenger tire. The cooling belt is used in heavy equipment tires that operate at very low speeds, and is not concerned with reducing tire noise by changing the characteristics of the sound waves produced within the pneumatic tire, as is the present invention.

Although several of the prior art devices and systems discussed above are concerned with the reduction of noise generated within the air chamber of a vehicle tire, they all require relatively complicated and expensive devices and structures which increase the cost of the tire and the manufacture thereof, as well as increasing the difficulty of changing the tire after the device or system is in place on the rim or on the interior walls of the tire. These prior art devices also reduce the tire noise by the providing of sound deadening members within the tire, and not by changing the characteristics of the sound waves generated within the tire.

There is no known noise reduction system for vehicle tires of which we are aware which reduces tire noise by the use of flexible non-self-supporting baffles, preferably formed of cloth, which are attached either to the rim of the tire assembly or to the interior of the tire, and which become active only when the tire is rotating, in order to change the characteristics of the sound waves produced within the rotating tire.

SUMMARY OF THE INVENTION

Objectives of the invention include providing an improved noise-reduction system for vehicle tires which substantially reduces or eliminates the noise caused by the acoustic cavity resonance within the air chamber of a pneumatic tire by a plurality of flexible non-self-supporting baffles, preferably formed of a cloth material, spaced circumferentially about and on the rim of the wheel assembly, which function as a sound modifier by changing the characteristics of the sound waves produced within the air chamber.

A still further objective of the invention is to provide such a noise-reduction system in which the internal baffles collapse against the rim when the tire is stationary, thus preventing the baffles from interfering with the placement and/or removal of the tire on or from the rim.

Still another objective of the invention is to provide such a noise-reduction system in which the cloth baffles are extremely inexpensive and lightweight and can be secured easily to the rim or to the tire, preferably at equally spaced intervals, by an adhesive or other simple type of attachment mechanism.

Another objective of the invention is to provide such a noise-reduction system in which the cloth baffles preferably are formed to the profile shape of the interior cavity of the tire and preferably are spaced equally circumferentially throughout, and in which when the vehicle is moving, the centrifugal force caused by the rotating wheel assembly will force the baffles out into the air chamber obstructing the acoustic wave generated therein, thereby reducing the cavity resonance within the tire by changing the sound wave characteristics.

A further objective is to provide such a noise-reduction system which does not affect the manufacture of the wheel.

A still further objective of the invention is to provide such a noise-reduction system in which the baffles may be formed of a tacky cloth material or have a tacky substance applied thereto, such that a person when changing the tire, can stick the baffles against the rim so they will not hinder the mounting of the tire thereon, yet the centrifugal force will be strong enough to pull the baffles out of engagement with the rim and into the tire cavity.

Another objective of the invention is to provide such a noise-reduction system in which the baffles may be mounted on the tire from the region just inside the bead to the region intersected by the equatorial plane of the tire; in which the baffles are slightly larger than the opening between the beads and will rest on the area above the beads and on the rim when the tire is at rest, and in which the baffles will move outwardly into the tire cavity by the action of centrifugal force when the tire is rotating.

A further objective of the invention is to provide such a noise-reduction system in which the baffles can be attached to the tire or rim by chemical adhesives, mechanical fasteners, or by curing the baffle into the tire itself when formed as a component of the tire.

These objectives and advantages are obtained by the improved noise reduction system for a vehicle wheel assembly comprising an annular rim; a tubeless pneumatic tire mounted on the rim and forming an annular inner chamber therebetween; and a plurality of baffles, each being formed of a flexible non-self-supporting sheet of material attached at a fixed end within the inner chamber, whereby each of said baffles assumes a collapsed state and rests upon the rim when the wheel assembly is stationary, and assumes an extended position with a free end of the baffle extending into the inner chamber by the influence of centrifugal force when said wheel assembly is rotating to reduce the amount of acoustic resonance within said chamber by changing the characteristics of sound waves created within the inner chamber by the rotating wheel assembly.

BRIEF DESCRIPTION OF THE DRAWINGS

A preferred embodiment of the invention, illustrative of the best mode in which applicants have contemplated applying the principle, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
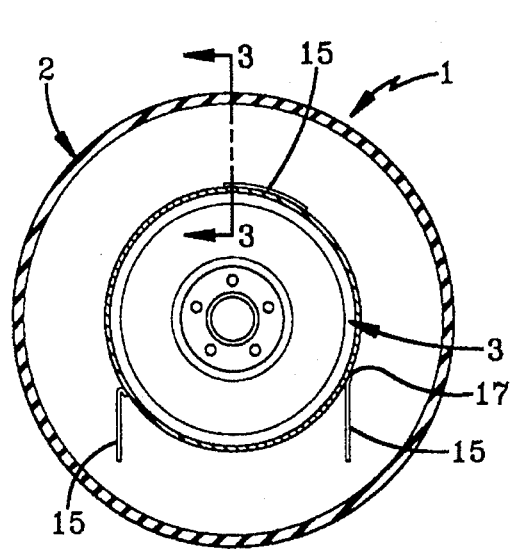
FIG. 1 is radial sectional view through a usual pneumatic vehicle wheel assembly showing the position of the internal baffles when the wheel assembly is stationary.
Figure 3:
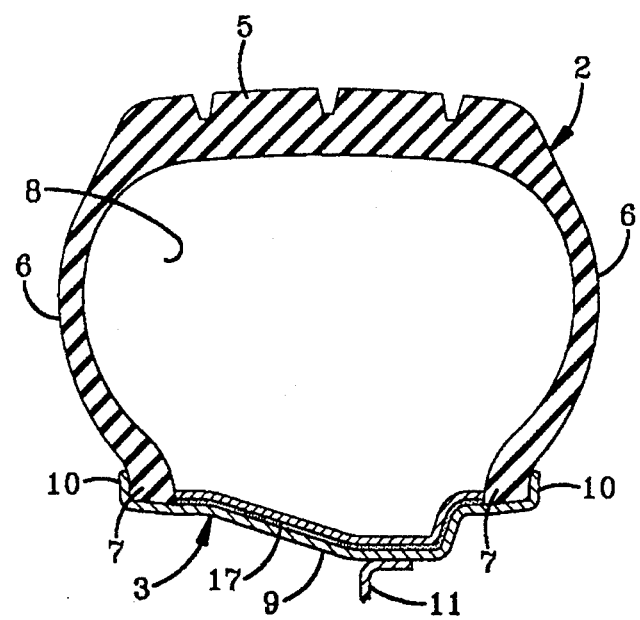
FIG. 3 is an enlarged fragmentary sectional view taken on line 3—3, FIG. 1.
Figure 2:
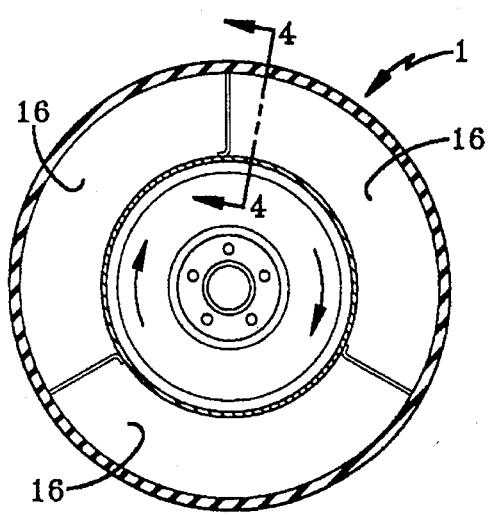
FIG. 2 is a diagrammatic sectional view similar to FIG. 1, showing the position of the baffles when the tire assembly is rotating.
Figure 4:
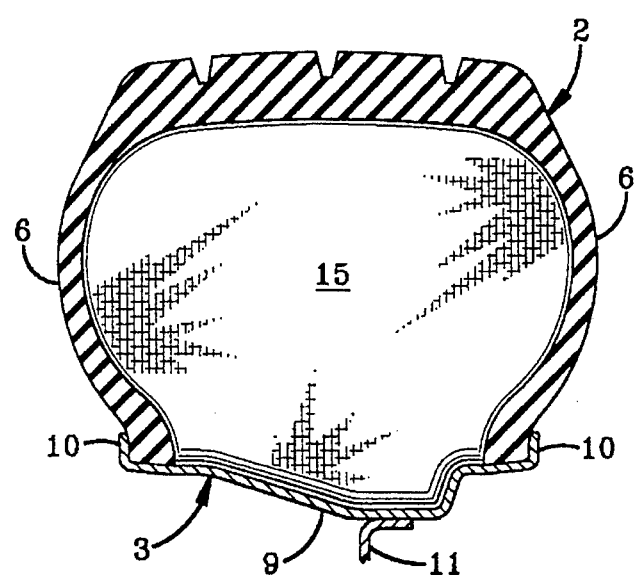
FIG. 4 is an enlarged fragmentary sectional view similar to FIG. 3 taken along line 4—4, FIG. 2.

FIGS. 1 and 2 are radial cross sections through a usual vehicle wheel assembly, which is indicated generally at 1. Wheel assembly 1 includes a usual pneumatic tire 2 and a wheel 3. Referring to FIGS. 3 and 4, tire 2 is of a usual construction having a tread 5, a pair of sidewalls 6, and bead areas 7, which when mounted on wheel 3 form an internal air chamber or cavity 8. Wheel 3 is also of a usual construction having an annular rim 9, a pair of end flanges 10 which form bead seats, and a radially extending mounting flange 11.

In accordance with the invention, a plurality of baffles, each of which is indicated at 15, are mounted at one end on rim 9 of wheel 3, as shown particularly in FIG. 3. Baffles 15 preferably are formed of an extremely flexible lightweight cloth, such as a single ply thickness of woven cotton, which is non-self-supporting, so that it collapses under its own weight upon the rim, as shown in an upper portion of FIG. 1, or hangs loosely therefrom, depending upon its final position, when the wheel assembly is stationary. However, upon the wheel assembly rotating, the centrifugal force acting upon the lightweight, flexible baffles will extend the baffles radially outwardly within cavity 8 to the positions shown in FIGS. 2 and 4. This forms a plurality of partition-like members spaced circumferentially about the annular cavity, as shown in FIG. 2, which obstructs the acoustic wave traveling within the cavity, reducing the cavity resonance, and, correspondingly, the noise produced by the rotating tire.

Preferably, baffles 15 are cut to the profile shape of interior cavity 8, as shown in FIG. 4, so that when the baffles extend radially outwardly to their operating position, they will form a substantially complete partition across the interior of tire 2, dividing the tire interior into a plurality of subchambers 16. In the preferred embodiment, three baffles 15 are provided, and are spaced equally circumferentially about the rim, as shown in FIG. 2, that is, at 120° spacing, to avoid any unbalanced forces acting upon the rotating wheel assembly. However, if desired, two, four or more baffles may be used.

Baffles 15 could have a modified profile than that shown in FIG. 4 so as not to conform to the interior of the tire without affecting the concept of the present invention. Likewise, baffles 15 could be formed of other types of materials such as plastic or synthetic materials, multiple layers of cloth secured together, or paper which has been coated to withstand the forces and the environment within the air chamber of the tire.

One end of each baffle 15 preferably is secured to rim 9 by an adhesive 17, as shown in FIG. 3, or by other attachment means with its opposite end and sides being unattached. Various types of mechanical attachment means, such as rivets, screws or the like, could be used, although the same would increase the weight of the final wheel assembly, and it is believed that an adhesive or similar type of bonding material could be utilized effectively.

It also has been found that the formation of baffles 15 of a tacky material or the use of a tacky substance on all or part of the surface thereof, may be desirable. Thus, during the changing of a tire, the repairman could stick the baffles against the rim of the wheel so they would not hinder the mounting of the tire thereon. However, the centrifugal force would still be strong enough to pull the baffles away from the rim and into the tire cavity after the wheel assembly begins rotating.

Figure 5:
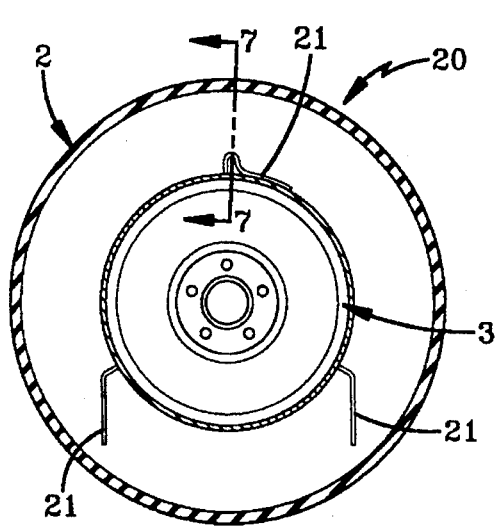
FIG. 5 is a sectional view similar to FIG. 1 of a second embodiment of the invention in which the baffles are mounted on the tire.
Figure 7:
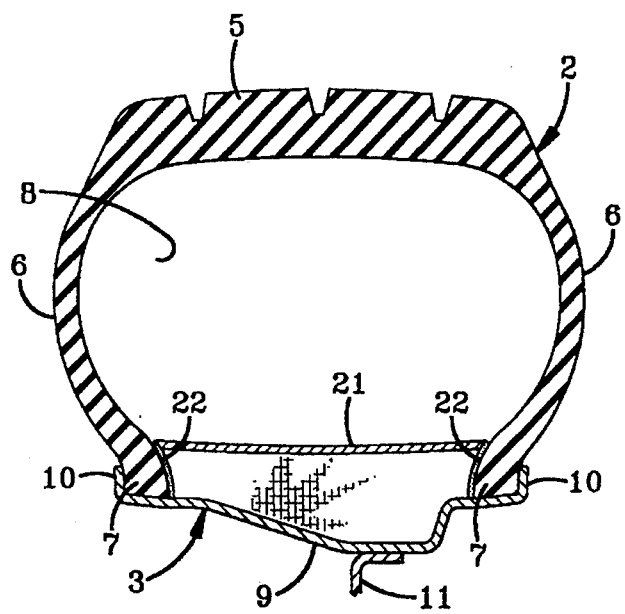
FIG. 7 is an enlarged fragmentary sectional view taken on line 7—7, FIG. 5.
Figure 6:
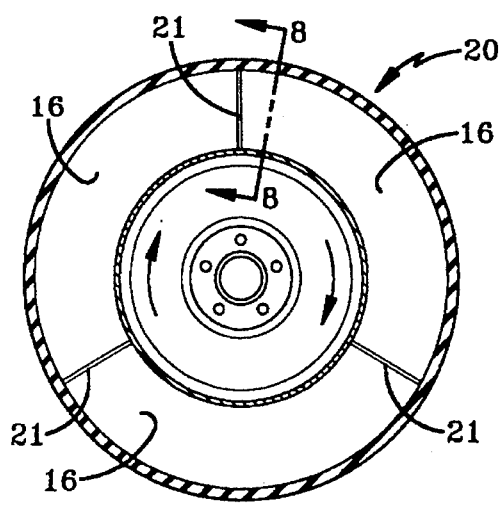
FIG. 6 is a diagrammatic sectional view similar to FIG. 5 showing the position of the baffles when the vehicle wheel assembly is rotating.
Figure 8:
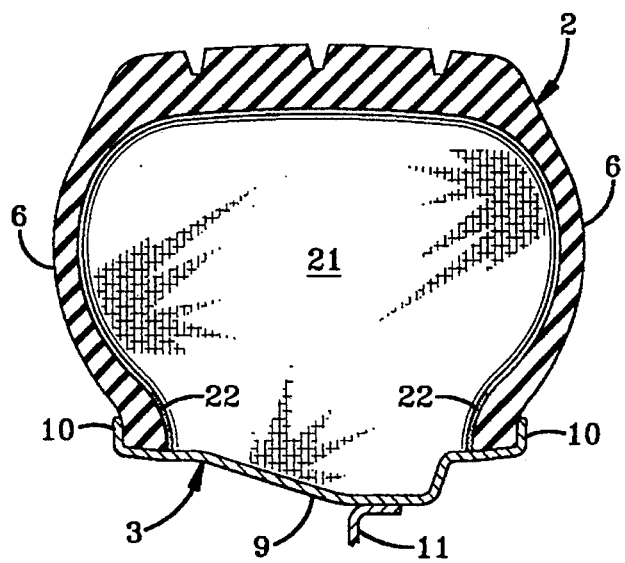
FIG. 8 is an enlarged fragmentary sectional view taken on line 8—8, FIG. 6.

A second embodiment of the invention is indicated generally at 20 and is shown in FIGS. 5–8. Embodiment 20 is similar in many respects to embodiment 1 described above, with the main difference being that a plurality of baffles, each of which is indicated generally at 21, is secured to the sidewalls 6 of tire 2 adjacent the bead areas 7 thereof by short segments of attachment, indicated at 22. Baffles 21 preferably are formed of the same materials as described above with respect to baffles 15, and can be attached to tire 2 by chemical adhesives, by mechanical fasteners, or by curing to the tire during the manufacture thereof. The baffles are mounted on the tire from the region just inside the bead to the region intersected by the equatorial plane of the tire. The baffles preferably are slightly larger than the opening between the beads and rest on the area above the beads and on the rim when the tire is at rest. Again, when the tire is in motion, centrifugal force will move the baffles into the tire cavity, as shown in FIGS. 6 and 8. Again, the configuration of baffles 21 preferably conforms substantially to the interior of the tire cavity, although the same is not required to achieve the desired results.

Again, baffles 21, three of which are shown in embodiment 20, are not formed of a sound-deadening material, but rather function as a sound modifier that changes the characteristics of the sound waves naturally generated within the rotating tire. In a rotating tire, the length of the sound wave is about the size of the circumference at the mean diameter of the tire. This sound wave sets up a resonance condition in the tire. In some tires the resonant condition may be dampened by the tire construction and the tire materials, while in other tires, the construction and the materials of the tire actually cause the tire to vibrate at a harmonic or one of the multiples of the harmonic, thereby exacerbating the noise problem. For such tires the baffles, as shown in the two embodiments discussed above, are useful, because it causes a frequency increase, which decreases the length of the sound wave. At the modified wave length, the tire can more readily dampen the effects of the sound and can decrease the noise exponentially. The number of baffles will depend upon the length of the sound wave and the wave length multiples for a particular tire.

Accordingly, the improved noise reduction system of the present invention is extremely inexpensive, requiring only several pieces of fabric which can be formed of cotton, wool or other textiles, treated paper, plastic or other synthetic material, the main requirement being that it is a soft enough fabric so as to collapse upon the rim, as shown in FIGS. 1 and 5, or hang freely therefrom when the tire is at rest. The baffles also may be secured to the rim by a tacky substance or rolled up during mounting of the tire on a wheel, so as not to hinder the changing of the tire. These lightweight baffles will add almost no weight to the final wheel assembly, and will not require additional components for securing the baffles to the rim, which could become loose or out of balance during continuous use. Also, the use of such baffles requires no modifications or extra operations during the manufacture of the wheel.

Accordingly, the noise-reduction system of the present invention is simplified, provides an effective, safe, inexpensive, and efficient system which achieves all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved noise-reduction system for vehicle tires is constructed and used, the characteristics of the construction, and the advantageous, new and useful results obtained; the new and useful structures, devices, elements, arrangements, parts and combinations, are set forth in the appended claims.

We claim:

1. A noise-reduction system for a vehicle wheel assembly comprising:
    an annular rim;
    a tubeless pneumatic tire mounted on the rim and forming an annular inner chamber therebetween; and
    a plurality of baffles, each being formed of a flexible non-self-supporting sheet of material attached at a fixed end within the inner chamber, whereby each of said baffles assumes a collapsed state and rests upon the rim when the wheel assembly is stationary, and assumes an extended position with a free end of the baffle extending into the inner chamber by the influence of centrifugal force when said wheel assembly is rotating to reduce the amount of acoustic resonance within said chamber by changing the characteristics of sound waves created within the inner chamber by the rotating wheel assembly.

2. The system defined in claim 1 in which the baffles have a profile which substantially conforms to a radial cross section of the inner chamber of the wheel assembly when the wheel assembly rotates.

3. The system defined in claim 1 in which the baffles are formed of cloth.

4. The system defined in claim 1 in which the fixed end of each of the baffles is attached to the rim by an adhesive.

5. The system defined in claim 4 in which three baffles are mounted on the rim.

6. The system defined in claim 5 in which the three baffles are spaced equally circumferentially about the rim.

7. The system defined in claim 1 in which the baffles are tacky to enable said baffles to stick to the rim during changing of the tire.

8. The system defined in claim 1 in which each of the baffles is a single ply thickness of the sheet material.

9. The system defined in claim 1 in which the tire has a pair of spaced sidewalls terminating in annular bead areas; and in which the baffles each includes attachment means for attaching the fixed end of each of the baffles at spaced locations to the tire adjacent the bead areas, with said fixed end extending between said bead areas.

10. The system defined in claim 9 in which the attachment means includes a chemical adhesive.

11. The system defined in claim 9 in which the attachment means includes bonding of the baffles to the tire when the tire is cured.

* * * * *